US009308808B2

(12) United States Patent
Griesmeier et al.

(10) Patent No.: US 9,308,808 B2
(45) Date of Patent: Apr. 12, 2016

(54) TRANSMISSION DEVICE HAVING A PLURALITY OF SHIFT ELEMENTS

(75) Inventors: Uwe Griesmeier, Markdorf (DE); Johannes Kaltenbach, Friedrichshafen (DE); Christian Sibla, Friedrichshafen (DE); Stefan Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 144 days.

(21) Appl. No.: 14/236,914

(22) PCT Filed: Jul. 5, 2012

(86) PCT No.: PCT/EP2012/063118
§ 371 (c)(1),
(2), (4) Date: Feb. 4, 2014

(87) PCT Pub. No.: WO2013/020759
PCT Pub. Date: Feb. 14, 2013

(65) Prior Publication Data
US 2014/0182415 A1 Jul. 3, 2014

(30) Foreign Application Priority Data

Aug. 9, 2011 (DE) .......................... 10 2011 080 677

(51) Int. Cl.
*F16H 3/66* (2006.01)
*B60K 6/42* (2007.10)
(Continued)

(52) U.S. Cl.
CPC . *B60K 6/42* (2013.01); *B60K 6/365* (2013.01); *B60K 6/48* (2013.01); *F16H 3/66* (2013.01); *B60K 2006/4808* (2013.01); *F16H 3/126* (2013.01); *F16H 2061/0433* (2013.01); *F16H 2200/0065* (2013.01);
(Continued)

(58) Field of Classification Search
None
See application file for complete search history.

(56) References Cited

U.S. PATENT DOCUMENTS 8,152,682 B2   4/2012  Swales et al.
8,257,215 B2   9/2012  Borntraeger
(Continued)

FOREIGN PATENT DOCUMENTS

DE    10 2007 005 438 A1    8/2008
DE    10 2008 032 320 A1    1/2010
(Continued)

OTHER PUBLICATIONS

German Search Report Corresponding to 10 2011 080 677.6 mailed May 24, 2013.
(Continued)

*Primary Examiner* — Justin Holmes
(74) *Attorney, Agent, or Firm* — Davis & Bujold, P.L.L.C.; Michael J. Bujold

(57) ABSTRACT

A drive engages a shaft (4) and, via at least one shaft (5, 6) of a transmission, an electric machine. An output can be connected to another shaft (9). During gear shifts, the shafts (4, 5, 6, 9) are couple such that the rotational speed of the shaft (5, 6), which can couple the electric machine when torque at the shaft (9) is equivalent to the torque of the electric machine, and is a product of the gear ratio between the shaft (5, 6) and the shaft (9) and the rotational speed of the shaft (9) or, when torque present at the shaft (9), is equal to the torque of the drive engine or electric machine, and is a sum of the product of the rotational speed of the shaft (4) and a first variable, and the product of the rotational speed of the shaft (9) and a second variable.

17 Claims, 2 Drawing Sheets

(51) Int. Cl.
   *B60K 6/365* (2007.10)
   *B60K 6/48* (2007.10)
   *F16H 3/12* (2006.01)
   *F16H 61/04* (2006.01)

(52) U.S. Cl.
   CPC ............... *F16H 2200/2012* (2013.01); *F16H 2200/2046* (2013.01); *F16H 2200/2094* (2013.01); *Y02T 10/626* (2013.01); *Y02T 10/6221* (2013.01); *Y10S 903/902* (2013.01); *Y10T 74/19014* (2015.01)

(56) References Cited

U.S. PATENT DOCUMENTS

| | | | |
|---|---|---|---|
| 8,535,188 B2 | 9/2013 | Tangl | |
| 8,734,294 B2 * | 5/2014 | Hiasa | F16H 61/04 475/324 |
| 2003/0166429 A1 * | 9/2003 | Tumback | B60K 6/445 475/5 |
| 2007/0155584 A1 * | 7/2007 | Tabata | B60K 6/40 477/70 |
| 2009/0186735 A1 | 7/2009 | Iwanaka et al. | |
| 2010/0108414 A1 | 5/2010 | Kaltenbach | |

FOREIGN PATENT DOCUMENTS

| | | |
|---|---|---|
| DE | 11 2008 000 777 T5 | 4/2010 |
| DE | 10 2008 043 341 A1 | 5/2010 |
| DE | 10 2009 041 207 A1 | 9/2010 |
| EP | 1 504 946 A2 | 2/2005 |
| EP | 2 182 250 A2 | 5/2010 |
| JP | 9-257121 A | 9/1997 |

OTHER PUBLICATIONS

International Search Report Corresponding to PCT/EP2012/063118 mailed Sep. 17, 2012.

Written Opinion Corresponding to PCT/EP2012/063118 mailed Sep. 17, 2012.

* cited by examiner

| SHIFT MATRIX | B | A | F | D | E | C | i | phi |
|---|---|---|---|---|---|---|---|---|
| "1" |  | X | X |  |  | X | 5.531 | 1.713 |
| "2" |  |  | X | X |  | X | 3.228 | 1.446 |
| "3" |  | X | X | X |  |  | 2.232 | 1.379 |
| "4" |  |  | X | X | X |  | 1.619 | 1.341 |
| "5" |  | X |  | X | X | X | 1.207 | 1.207 |
| "6" | X |  |  | X | X | X | 1.000 | 1.160 |
| "7" |  | X |  |  | X | X | 0.862 | 1.193 |
| "8" | X | X |  |  | X |  | 0.722 | 1.174 |
| "9" | X | X |  |  |  |  | 0.615 | 8.988 |
| "R" | X | X | X |  |  |  | −5.165 | −0.934 |

Fig. 2

TRANSMISSION DEVICE HAVING A PLURALITY OF SHIFT ELEMENTS

This application is a National Stage completion of PCT/EP2012/063118 filed Jul. 5, 2012, which claims priority from German patent application serial no. 10 2011 080 677.6 filed Aug. 9, 2011.

FIELD OF THE INVENTION

The invention concerns a transmission device with several shift elements.

BACKGROUND OF THE INVENTION

A transmission device designed as a multi-gear planetary coupling transmission with several gearsets and several shift elements is known through DE 10 2007 005 438 A1. Depending on activation of the shift elements, different shift ratios can be created. At least an electric machine is provided which is in an operational connection with one of the planetary sets. Torque can be initiated by the electric machine in one of the planetary gear sets assigned to the electric machine through a shaft, to support another shaft at the assigned planetary set torque for creating a gear ratio in the planetary coupling transmission by way of the electric machine.

The electric machine replaces a load shift element, preferably designed as frictional connection in a conventional planetary coupling transmission, wherein by means of the electric machine, beside the transmission functions, such as load shifts, non-wearing start procedures and similar, also several hybrid functions, such as electro-dynamical, wear reducing start procedures, regenerative braking etc. are feasible. The hybrid functions which can be created with the electric machine are hereby dependent on the characteristics of the wheel set, as well as the power rating of the electric machine.

In addition, such a multi-gear planetary coupling transmission can be designed in different configurations, wherein a drive train of a vehicle which can be designed having a multi-gear planetary coupling transmission without a starting element, such as a hydrodynamic torque converter or a frictional contact starting clutch. In addition, a multi-gear planetary coupling transmission, which is designed with-instead of a shift element, with an electric machine, and can be designed with, instead of frictional contact shift elements, form-locking shift elements, as well as a reduced lubrication oil supply with a hydraulic gearset.

However, the disadvantage is herein that the planetary coupling transmission needs to be designed for the creation of a start-stop operation with a combustion engine and which is in an operational connection with a planetary coupling transmission, also requires an additional electric machine which increases the total weight of the vehicle and the manufacturing costs, and also requires and expands the construction space of the planetary coupling transmission to an unwanted size.

SUMMARY OF THE INVENTION

The present invention has therefore the task to provide a cost-effective and construction space effective transmission device through which a vehicle can be operated with a high efficiency and where gear ratio changes can be executed possibly without interruptions of pull force.

In accordance with the invention, this task is solved by a transmission device having the characteristics discussed below.

The inventive transmission device comprises several shift elements which are used to implement different gear ratios during an engaged or disengaged operating condition. A drive machine can at least be coupled with a shaft and an electric machine with at least another shaft of the transmission device, while an output of the vehicle can be transmitted through another additional shaft in an operating connection with the transmission device.

In accordance with the invention, the shaft and at least another shaft and the additional shaft can be operationally connected, during a gear ratio change, in which there is almost no interruption in traction force, starting with a currently engaged nominal gear ratio in the direction of a requested target gear ratio through the shift elements which are involved in the gear ratio change, in a way that the rotational speed of at least the other shaft, which can be connected with the electric machine, during the insertion of a torque which is equivalent to the torque of the electric machine at the additional shaft equals a product of the gear ratio between the other shaft and the additional shaft and the rotational speed of the additional shaft, or during the introduction of an equivalent torque to the torque of the drive machine and the torque of the electric machine at the additional shaft equals a sum of a product of the rotational speed of the shaft and a first variable which equals a negative quotient of a torque that is introduced by the electric machine and through a combustion engine, and the product resulting from the rotational speed of the additional shaft and a second variable which is equal to a product of the gear ratio between the shaft and the additional shaft and the first variable.

The construction of the inventive transmission device takes place in a way that an electric machine, linked to at least another shaft of the transmission device during all gear ratio changes in the transmission device, can receive the traction force in the area of the output. In the ideal case, the transmission device is designed without drag losses in the disengaged operating condition which are caused by frictional contact of shift elements and also without synchronizations. This means that all shift elements of the transmission device at that time are designed as form locking shift elements or as claw shift elements, respectively.

In this invention, the electric machine is integrated into the transmission device or linked, respectively, in a way so that for each transmission device and the executed shifting or for each gear ratio change, respectively, a condition is met that the rotational speed, with the shift elements which are involved in the gear ratio change, of the shaft of the transmission device which is connected with the electric machine is equal to the product of the gear ratio between the other shaft and the additional shaft, or the sum of the product of the rotational speed of the shaft and the first variable and the product of the rotational speed of the additional shaft and the second variable. Hereby, the shift elements which are involved in the shift are meant to be shift elements which are engaged during the shift and they create the intersection between the amount of engaged shift elements during a shifted nominal gear ratio and the amount of engaged shift elements during a shifted targeted gear ratio.

In a respective selection of the structure of the transmission, this condition can be met by a single shaft in the transmission device during all gear ratio changes in the transmission device. In some cases it is necessary and even advantageous to connect the electric machine, depending on the respective requested shifting, with different additional shafts of the transmission device.

Requested gear ratio changes are performed in the transmission device according to the invention either as so-called output-based or as so-called EDA gearshifts.

During an output supported shift in the transmission device, the electric machine, which can be coupled with the transmission device, provides a set gearshift at the additional shaft through a defined gear ratio and therefore at the output for a vehicle. Thus, and during output supported shifts, only the electric machine at the output provides torque. If a requested gear ratio change represents an output supported shifting, the rotational speed of the drive machine can be guided, independently of the operating conditions of the electric machine, in the direction of the rotational speed of the targeted gear ratio which needs to be shifted.

As the difference here to and during EDA-shifts, where the electric machine acts as an electro-dynamic starting element, torque of the drive machine, as well as torque of the electric machine is present at the output or at the additional shaft of the transmission device which can be coupled with that, respectively, whereby torque of the drive machine is supported in addition in the area of the electric machine. This creates the possibility to setting the rotational speeds in the transmission device for mainly load-free shifting of the targeted gear ratio in the synchronized operating condition, or the shift elements which have to be engaged or disengaged, by continuous adjustment of the rotational speed of the drive machine, and to shift thereafter the targeted gear ratio in the transmission device.

Basically, through this connection and with a shifted gear ratio then the transmission device, with preferably a drive machine which is designed as a combustion engine, and an additional electric machine which is in operational connection with the transmission device, all hybrid functions can be created, whereby the inventive transmission device, compared to more or less known load shift transmissions, has through friction shift elements a significantly improved efficiency.

Hereby, a vehicle which is designed with the inventive transmission device which is coupled with a drive machine and an electric machine which is operationally connected with it, a boost operating mode, a recuperation operating mode, a shift of an operating point of the drive machine, a pure electrical drive mode while only through the electric machine drive torque is provided which is present at the output, as well as a start of the drive machine which is designed as a combustion engine, and charging of an electric storage which is assigned to the electric machine, can be realized in a cost-effective as well as space effective art and manner.

The characteristics which are presented in the invention, as well as the characteristics which have been presented in the following embodiment example of the invented transmission device, are each by itself or in any combination suitable to further enhance the invented matter. The respective combination of characteristics represents, in regard to a further enhancement of the matter and in accordance with the invention, no limitation but have mainly just exemplary characteristics.

BRIEF DESCRIPTION OF THE DRAWINGS

Further advantages and advantageous embodiments of the invention will become apparent from the description of the principle embodiment with reference to the drawings.

These show.

DETAILED DESCRIPTION OF THE PREFERRED EMBODIMENTS

Figure 1:
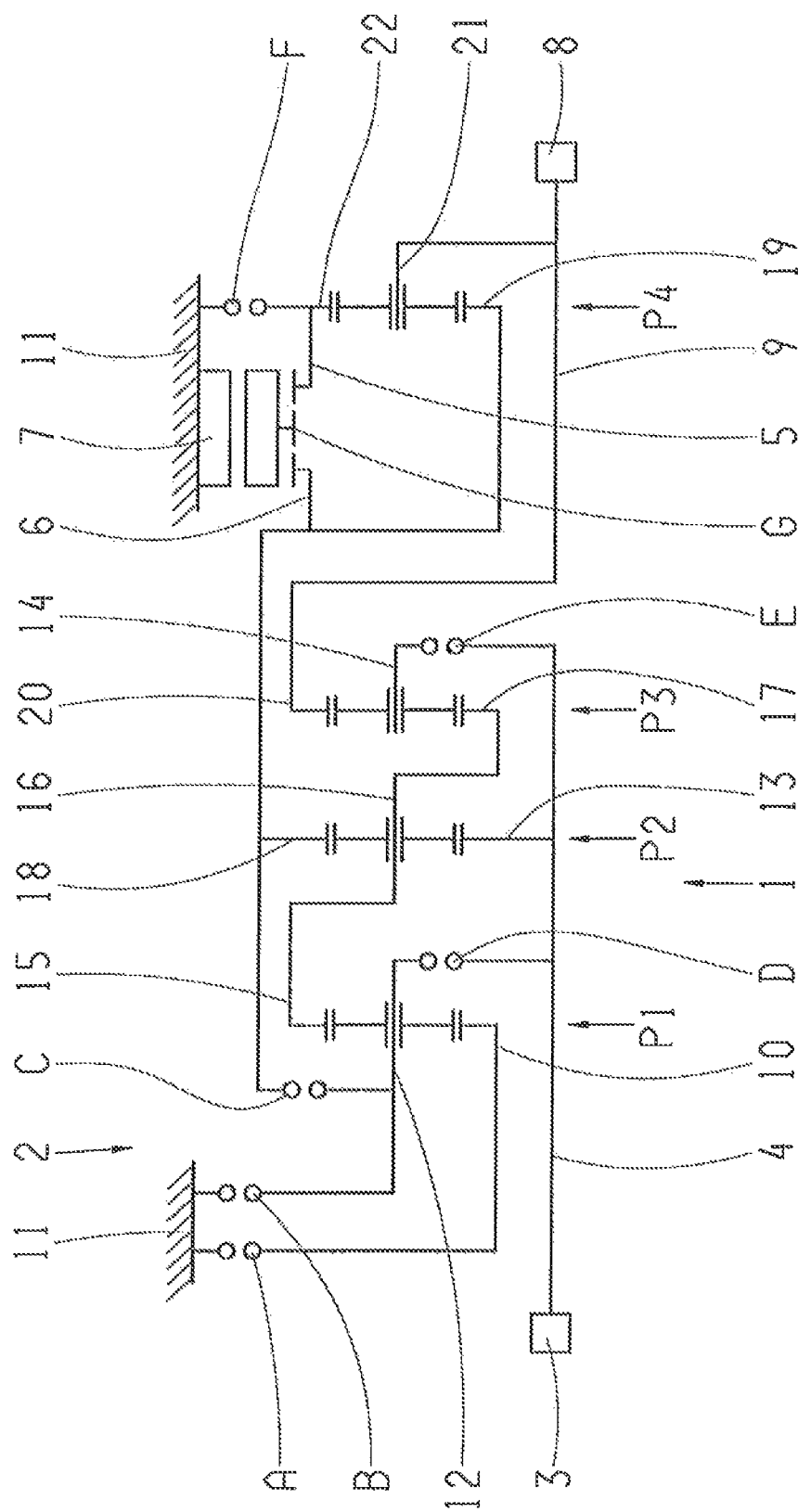
FIG. 1 a highly schematic representation of a motor vehicle drive train with an example embodiment of the inventive transmission device, and FIG. 2 a shift matrix of the transmission device in accordance with FIG. 1.

FIG. 1 shows a transmission device 1 which is part of the drive train 2 of a motor vehicle in a highly schematic presentation, which has beside the transmission device 1 a drive engine 3 designed as a combustion engine. The drive engine 3 is operationally connected by means of shaft 4 with the transmission device 1. In addition, the transmission device 1 can be connected via two other shafts 5, 6 with an electric machine 7, while the output 8 of the motor vehicle drive train 2 is operationally connected by way of an additional shaft 9 with the transmission device 1.

By means of the transmission device 1, nine gear ratios "1" to "9" and a gear ratio "R" for reverse drive can be implemented by alternating engagement or disengagement of different shift elements A to F wherein, for the implementation of the gear ratios "1" to "R" the shift elements A to F which need to be kept in an engaged operating condition as shown in FIG. 2, are each marked with the letter X, while the additional shift elements A to F are each to be brought into or kept in a disengaged operating mode. In addition, the shift matrix as shown in FIG. 2 has in the column, marked with the letter i, exemplary numerical values of gear ratios, as well as in the last column the numerical values of the ratio steps phi.

The electric machine 7 can be connected, via a form-locking double shift element G, with either of the other shaft 5, with other shaft 6, or with neither of the two shafts, to execute in the transmission device 1 at least an approximate traction-force and uninterrupted gear ratio change, and also to execute different hybrid functions such as a boost mode, a recuperation operation, a shift of the operating point of the drive machine 3, a pure electric drive mode of a vehicle which is equipped with the vehicle drive train 2, a start operation of the drive machine 3 through the electric machine 7, as well as a charging operation of an electric storage device which is assigned to the electric machine 7.

Hereby, a boost, a recuperating, or an operating point shift is possible at the time when one of the gear ratios "1" to "R" is firmly shifted. To implement a pure electric drive mode, during which the rotational speed of the shaft 4 is essentially equal to zero, the electric machine 7 needs to be linked through the double shift element G with the other shaft 6 and at the same time engage the form-locking shift element F which is designed as a brake. As an alternative hereto, a pure electric drive mode is possible when the shaft 4 does not rotate and at the same time the other shaft 5 is coupled, via the double shift element G, with the electric machine 7, when also the form-locking shift element B, designed as a brake, and at the same time the shift element C, which is designed as a form-locking clutch, are engaged.

The above mentioned starting operation of the drive machine 3, and also the operation of charging the electric storage which is assigned to the electric machine 7, is only possible at the time when the electric machine 7 is connected with the other shaft 6 through the double shift element G, and the shift element C and the shift element D are engaged, because the drive engine 3 needs to be directly coupled with the electric machine 7 to create these operating conditions.

If a vehicle which is equipped with the vehicle drive train 2 needs to be started by the drive engine 3 when the vehicle standing, without wear and thus with minimal power losses, the electric machine 7 needs to be operated as an electro-dynamic starting element and needs to be connected with the other shaft 5 via the double shift element G. If the starting procedure is executed in the first gear ratio "1" for a forward drive, only the shift elements A and C are engaged and the shift element F is maintained in the disengaged operating condition. For the start mode, the rotational speed of the drive engine 3 is equalized by the respective operation of the electric machine 7, with the rotational speed of the additional shaft 9, and thus also of the output 8 are at first equal to zero. To increase the rotational speed of the output 8, the output torque in the area of the electric machine 7 needs to be supported. Thereafter, the rotational speed of the other shaft 5 is brought to the value of zero by way of the electric machine 7, also the form-locking shift element F, which is designed as a brake is engaged under low load when a suitable differential rotational speed range is reached for the addition of the shift element F, wherein the first gear ratio "1" for the forward drive is finally shifted into in the transmission device 1.

The transmission device 1 which is designed as planetary coupling transmission comprises, in the embodiment illustrated in the drawing, four three-shaft planetary gear sets P1 to P4, with their shafts partially connected to each other and which can be rotationally fixed or can be partially rotationally fixed by way of the shift elements C, D, and E.

Herein, a shaft 10, which is designed as sun gear of the first planetary gear set P1, can be connected by the shift element A with a housing 11 of the transmission device 1, while a second shaft 12 of the first planetary gear set, which represents a planetary carrier, can be linked through the shift element D with the shaft 4 or the transmission input shaft of the transmission device 1, as well as a shaft 13 of the second planetary gear set P2, which is also designed as a sun gear. In addition, with the shift element D engaged, the planetary carrier 12 of the first planetary gear set P1, can be connected, via the form-locking shift element E designed as clutch, with a shaft of the third planetary gear set P3 which is designed as a planetary carrier. A third shaft 15 of the first planetary gear set, designed as a ring gear, is connected in a rotationally fixed manner with a second shaft 16, which is designed as a planetary carrier, of the second planetary gear set P2 and a second shaft 17, designed as a sun gear, of the second planetary gear set P2.

The planetary carrier 12 of the first planetary gear set P1 can be connected in a rotationally fixed manner, via the shift element C, with the further shaft 6 of the transmission device 1 and with a third shaft 18 which is connected to it, whereby the further shaft 6 is also connected in a rotationally fixed manner with a first shaft 19, designed as a sun gear, of the fourth planetary set P4.

In addition, a third shaft 20, designed as a ring gear, of the third planetary gear set P3, as well as a second shaft 21, which represents a planetary carrier, of the fourth planetary gear set P4 are operationally connected with the additional shaft or the transmission output shaft 9 of the transmission device 1, respectively. A third shaft 22, designed as a ring gear, of the fourth planetary gear set P4 is connected in a rotationally fixed manner with a further shaft 5 of the transmission device 1 and can be connected together with the further shaft 5 in a rotationally fixed manner, via shift element F, with the housing 11.

Because the form-locking shift element F, for the creation of the first four gear ratios "1" to "4" for the forward drive, is maintained in an engaged operating condition, traction force uninterrupted output supported shifts can at least be created between the gear ratios "1" to "4", by way of the rotationally fixed connection of the electric machine 7 with the further shaft 6 and via a pure electro-motor traction force created by the electric machine 7. This results from the fact that the electric machine 7, when coupled with the further shaft 6 and at the same time with the engaged shift element F, is connected via a fixed gear ratio with the output 8 or the additional shaft 9, respectively. Hereby and with a respective request, gear ratios steps can be skipped and, for instance, a gear ratio change from the first gear ratio "1" directly to the gear ratio step "3" or the gear ratio step "4", or also downshifts can be executed essentially free of traction force interruption. A rotational speed n6 of the other shaft 6, which is rotationally fixed, via the double shift element G, with the electric machine 7, corresponds to a product of the gear ratio between the electric machine 7 or the other shaft 6, respectively, and the additional shaft 9 or the transmission output shaft, respectively, and the rotational speed n9 of the transmission output shaft 9.

If a respective request is made for a gear ratio shift within the first gear ratio range which include the gear ratios "1" to "4", a load transfer can initially be created via the added drive engine 3 in the direction of the electric machine 7, whereby this can be executed within the limits of the power capacity of the electric machine 7. If the power capacity of the electric machine 7 is not sufficient, the load transfer from the drive engine 3 in the direction of the electric machine 7, it can be supported by a load decrease or reduction, respectively, of the drive torque actually created by the drive engine 3, and/or by at least a partial disengagement of an optionally provided separating clutch, positioned between the shaft 4 and the drive engine 3, and the shaft 4 is hereby in accordance with the request at no load. During this operating condition of the transmission device 1 or the vehicle drive train 2, the actually shifted nominal gear ratio "1" to "4" is feasible mainly through a load free disengagement of the shift element A, the shift element C, or the shift element E.

Thereafter, the differential rotational speed is reduced in the area of the shift elements D, A, E, or C, for the creation of the requested target gear ratio "1" to "4", by controlling the rotational speed of the drive engine 3, the shift element D, A, E, or C are introduced in at least an approximate synchronous operating mode. Hereby, control of the rotational speed of the drive engine 3 for the adjustment of the synchronous rotational speed of the target gear ratio in the transmission device 1 can be established, maybe in connection with an optionally available second electric machine which represents a starter generator, or an optional separating clutch provided between the transmission input shaft 4 and the drive engine 3. Finally, in each case depending on the present operating strategy, a respective load transition from the electric machine 7 in the direction to the drive engine 3, is partially or completely executed whereby the at least approximately continuous flow of traction force gear ratio change is executed in the desired manner and is completed.

If there is a request for a gear ratio change within the gear ratios "4" to "9" for a forward drive with the second gear ratio range, the electric machine 7 is connected with the further shaft 5 through the double shift element G, also the shift element E is engaged, which is always engaged in the gear ratios "4" to "9", the further shaft 6, the transmission input shaft 4 and the transmission output shaft 9 are operationally connected in such a way that the rotational speed n6 of the further shaft 6 corresponds to the sum of the product of a first variable V1 and a rotational speed n4 of the transmission input shaft 4, and the product through a second variable V2 and the rotational speed of the transmission output shaft 9. The first variable V1 is equal to a negative quotient, derived from an input torque of the electric machine 7 and an input torque from the combustion engine 3. The second variable corresponds to a product of the gear ratio between the transmission input shaft 4, and the transmission output shaft 9, and the first variable V1.

The rotational speeds of the drive engine 3 and the electric machine 7, as well as the rotational speed of the output 8, during load shifts, which represent EDA shifts, or at least with approximate tractive force uninterrupted gear ratio changes between the gear ratios "4" and "9", respectively, are in each case variable, while the ratios of the torques are hereby fixed, whereby the factors of the rotational speeds are also the factors of the torques, if one neglects the efficiencies in the area of the transmission device 1.

The fact, that the form-locking shift element E is always engaged in the gear ratios"4" to "9", is it possible that all gear ratio changes between the gear ratios "A" to "9" are load shiftable and that gear ratios in gear ratio changes within the second gear ratio range can also be skipped.

During the execution of a requested gear ratio change within the second gear ratio range and with a nominal gear ratio in the transmission device 1, the present torque in the vehicle drive train 2 in the area of the electric machine 7, needs to be supported in accordance with the ratio between the torque of the drive engine 3 and the torque of the electric machine 7 in the area of the electric machine 7. This causes the respective, shift element F, A, D, or C being activated to be brought into a load free operating condition, because the torque is hereby brought just through the shift element E.

In the case that the torque capacity of the electric machine 7 is not sufficient to completely support of the load, the respective, shift element being loaded needs to be brought, into at least an approximate load free condition by reducing the torque of the drive engine 3, so that the shift element being deactivated can be disengaged in the desired manner. Thereafter, the nominal gear ratio in the transmission device 1 is activated and each shift element, which needs to be added in, is synchronized under load by controlling the rotational speed of the electric machine 7 and the rotational speed of the drive engine 3. In at least an approximately synchronized operating mode of the shift element being added in, it is shifted into its engaged operating mode so as to engage the target gear ratio in the transmission device 1 whereby, depending on the respective, present operating strategy, a load reduction is partially or fully executed in the area of the electric machine 7, so as to complete the gear ratio change in the desired manner.

If the electric machine 7 is operationally connected with the other shaft 5 via the double shift element G, and if a respective request for a gear ratio change is present within the second gear ratio range, the rotational speed of the other shaft 5 can be determined for the calculation of the rotational speed of the other shaft 6, in accordance with the above more closely described formulaic relationship, where the variable V1 and the variable V2 each adopt other values, due to the changed gear ratios in the area of the transmission device 1. Otherwise, the procedure during the EDA-shift within the second gear ratio range of the transmission device 1, when the further shaft 5 is connected with the electric machine 7, corresponds to the procedure when the further shaft 6 is connected with the electric machine 7.

If a request is present for a gear ratio change in the form of an upshift or down shift between the gear ratios "3" to "5", the shift elements A and D each remain engaged during the gear ratio change, therefore the coupling between the transmission input shaft 4, the other shaft 5, and the transmission output shaft 9 exists solely through the shift elements A and D, and the rotational speed n5 of the other shaft 5 again corresponds to the sum of the product of the first variable V1 and the rotational speed of the transmission input shaft 4, and the product of the second variable V2 and the rotational speed n9 of the transmission output shaft. The rotational speeds of the drive engine 3, the electric machine 7, and the output 8 are again variable, while the ratios of the torques of the drive engine 3, of the electric machine 7, and the output 8 are fixed. The rotational speeds of the electric machine 7, before and after the gear ratio change, can be seen in the rotational speed plan of the other shaft 5.

The shifting process of the gear ratio change between the third gear ratio "3" and the fifth gear ratio "5" correspond again with the shifting process for a gear ratio change in the second gear ratio area, for which reason the previous description can be referred to.

If there is a request present for an up shift or down shift between the gear ratios "2" and "6" and if the electric machine 7 is connected, via the double shift element G, to the shaft 5, the shift element C and the shift element D will remain engaged. The two, engaged shift elements C and D create again a coupling between the transmission input shaft 4, the other shaft 5, and the transmission output shaft 9 in accordance with the following formulaic relationship:

$$n5 = V1 \times n4 + V1 \times n9$$

The rotational speed of the drive engine 3, the electric machine 7, and of the output 8 are again variable during the gear ratio change, while the ratios of the torques in the area of the drive engine 3, the electric machine 7, and of the output 8 are fixed. The rotational speed values of the electric machine 7, before and after the shift, can again be seen in the rotational speed plan of the further shaft 5.

The shift method during the gear ratio change between the second gear ratio "2" and the sixth gear ratio "6" again corresponds mainly with the shift method during a gear ratio change within the second gear ratio range, with reference being made at this point to the above description.

When the electric machine 7 is connected, via the double element G, to the further shaft 5, and there is a respective request for an upshift or downshift between the gear ratios "1" and "7", the shift elements C and A remain engaged during the gear ratio change. There exists again a coupling between the shafts 4, 5, and 9 through the two engaged shift elements C and A, in accordance with the previously mentioned relationship in the formula. The rotational speed values of the drive engine 3, the electric machine 7, and the output 8 are again variably adjustable while the ratios between the torques of the drive engine 3, the electric machine 7, and the output 8 are fixed. The rotational speed values of the electric machine, before and after the shift, can again be seen in the rotational speed plan of the further shaft 5. In addition, the shift methods during the gear ratio change, between the gear ratios "1" and "7", correspond to the gear ratio change as described within the second gear ratio range of the transmission device 1.

In the example embodiment of a transmission device 1 as shown in the drawing, the gear ratio changes within the first gear ratio range or load shifts, respectively, between the gear ratios "1" to "4" can be made essentially without traction force interruption, when the electric machine 7 is coupled with a further shaft 6. Shifts in the first gear ratio range of the transmission device 1 can be supported in the pure electro-motor mode. During the execution of a gear ratio change in the transmission device 1 in the second gear ratio range, the electric machine 7 can be operationally connected, via the double shift element G, to the other shaft 6, as well as to the other shaft 5. The shifts represent so-called EDA shifts, during which a torque is present at the output 8 which is equivalent to the torque of the drive engine 3 and thus equivalent to the torque of the electric machine.

Direct shifts between the gear ratios "5" and "3", "6" and "2", as well as "7" and "1" are only possible when the electric machine 7 is connected with the other shaft 5, whereby these shifts represent again EDA-shifts.

If, during the presence of a respective shift, the electric machine 7 needs to be changed between the two further shafts 5 and 6, a load re-distribution has to be executed initially between the electric machine 7 and the drive engine 3, meaning from the electric machine 7 in the direction of the drive engine 3, to disengage the double shift element G in the load free operating condition and to interrupt the operational connection between the further shaft 5 or the further shaft 6 and the electric machine 7. Thereafter, the double shift element G is brought through the control of the rotational speed of the electric machine 7 to an at least approximate synchronous operating condition and the desired operational connection between the electric machine 7 and the further shaft 5 or the further shaft 6 is established, and the double shift element G is brought into an engaged operating condition. Thereafter, a desired load distribution is adjusted between the electric machine 7 and the drive engine 3, in accordance with a respective operating strategy.

The change of the connection between the electric machine 7 and the further shaft 5 or the further shaft 6, respectively, takes place within the first gear ratio range of the transmission device 1, since a coupling of the electric machine 7 to the other shaft 5 within the first gear ratio range would result in a rotational speed of zero for the electric machine 7. In addition, the electric machine 7 needs to be coupled within the second gear ratio range of the transmission device 1 or starting with the fifth gear ratio "5", respectively, with the further shaft 5, to enable direct shifts and to avoid a standstill of the electric machine 7, which could for instance happen during a coupling of the electric machine 7 to the further shaft 6, when simultaneously a shifted gear ratio "8" in the transmission device 1 for a forward drive would occur. This means that, with a shifted eighth gear ratio "8" for a forward drive, a boost operation, a recuperation operation, as well as a shift of the operating point of the drive engine 3 is not possible. In addition, during a connection of the electric machine 7 to the further shaft 6, a direct shift is between the gear ratios "5" and "3", "6" and "2", as well as "7" and "1" is not possible.

Thus, a change of the operational connection between the electric machine 7 and the further shaft 5, as well as a further shaft 6, offer advantageously the possibility that the electric machine 7 also has, when an eighth gear "8" is shifted in the transmission device 1, a rotational speed which is unequal to zero, and direct shifts between the previously mentioned gear ratio transmission device 1 are possible. In addition, the electric machine 7 can be completely decoupled from the flow of force of the vehicle drive train 2 by the double shift element G, and it is possible to create through the shift ability of the electric machine 7 between the two other shafts 5 and 6 also a second gear ratio for pure electro-motor drive operation of a vehicle which is designed with the drive train 2. Thus, a start procedure of the vehicle drive train 2 by means of the electric machine 7, operated as an electro-dynamic starting element, is possible with a partial load.

In general, the inventive transmission device has the construction like an automatic transmission with preferably several planetary gear sets and several shift elements, whereby the shafts of the transmission device can be coupled through shift elements with each other or operationally connected with the housing. Gear ratios of the transmission device are created in a way that shift elements are added in and the additional shift element are disconnected. During a gear ratio change, one or several shift elements are in each case added in, while at least one shift element in each case is disconnected, and at least one other shift element is added in. The electric machine is at least connected to the transmission device in the area of its shaft.

During the gear ratio change, the electric machine is connected, through the operational connected shaft and through the remaining shift engaged elements during the gear ratio change through a fixed rotational speed ratio with the transmission output shaft. As an alternative, the electric machine, the drive engine, and the transmission output shaft are coupled with each other, through an operationally connected shaft which is connected with the electric machine 7 in a defined rotational speed ratio, so that a load shift is possible through the support of a present torque in the area of the electric machine 7 when operating as either a motor or a generator. Hereby, during the operating condition of the transmission device in which the electric machine, the drive engine, and the transmission output shaft are coupled through a defined rotational speed ratio, a rotational speed superimposition is created in the area of one or more planetary gear sets.

Low power losses occur in the area of the invented transmission device when the shift elements of the transmission device are designed as form-locking shift elements.

The electric machine can be linked to the transmission device in the area of a shaft, to execute a start procedure of the drive engine, which is designed as a combustion engine, during a neutral operating condition of the transmission device, where the flow of force is interrupted between the transmission input shaft and the transmission output shaft, and to at the same time charge the electric storage device which is operationally connected with the electric machine. In addition, the electric machine is connected, via a shaft, with the transmission device in a such way that a low loss start is possible for a vehicle which is equipped with the transmission device, by the electric machine which is then being operated as an electro-dynamic starter element, with a shifted gear ratio for the forward drive, wherein shift elements of the transmission device are simultaneously added in which usually are not activated during gear ratios in the transmission device.

In addition, the electric machine is connected to the transmission device in an area of a shaft in such a way that pure electric drive is possible, independent of the rotational speed of the transmission input shaft and therefore of the rotational speed of the drive engine, whereby this operating condition of the transmission device is again realized through simultaneous activation of shift elements, which usually are not activated in a gear ratio in the transmission device.

To enable a comfortable start of the drive engine during pure electro-motor drive operation by the electric machine which is coupled with the transmission device, it is possible to provide, in the area of the transmission input shaft, an additional electric machine in the form of a starter generator whereby, during stop and go drive operation, the onboard power can be provided through the starter generator.

If the inventive transmission device is designed with pure form-locking shift elements, it is possible for a vehicle which is equipped with the vehicle drive train, that during emergency braking the drive engine, which is designed as a combustion engine, can stall. This can be avoided in a simple manner by positioning a friction separating clutch in the area between the transmission input shaft and the drive engine. In addition, a vehicle which is equipped with the inventive transmission device, can be operated and started during a failure of the electric machine through such a friction separating clutch in a known manner.

REFERENCE CHARACTERS

1 Transmission Device
2 Vehicle Drive Train
3 Drive Engine
4 Shaft
5 Other Shaft
6 Other Shaft
7 Electric Machine
8 Output
9 Additional Shaft
10 Shaft of the first Planetary Gear Set
11 Enclosure
12 Shaft of the first Planetary Gear Set
13 Shaft of the second Planetary Gear Set
14 Shaft of the third Planetary Gear Set
15 Shaft of the first Planetary Gear Set
16 Shaft of the second Planetary Gear Set
17 Shaft of the third Planetary Gear Set
18 Shaft of the second Planetary Gear Set
19 Shaft of the fourth Planetary Gear Set
20 Shaft of the third Planetary Gear Set
21 Shaft of the fourth Planetary Gear Set
22 Shaft of the fourth Planetary Gear Set
A to G Shift Element
i Gear Ratio
n Rotational speed
phi Increment Step
P1 to P4 Planetary Gear Set
V1 First Variable
V2 Second Variable
"1" to "9" Gear Ratio in Forward Drive
R; Gear Ratio in Reverse Drive

The invention claimed is:

1. A transmission device (1) having a plurality of shift elements (A to G) which, in an engaged or a disengaged operating condition, being operatable for creating different gear ratios for the transmission device (1),
   a drive engine (3) being coupleable at least with an input shaft (4), and an electric machine (7) being selectively coupleable with each of first and second another shafts (5, 6), while an output (8) being operationally connectable with an additional shaft (9),
   the input shaft (4) and at least one of the first and the second another shafts (5, 6) and the additional shaft (9) during at least an approximate traction force uninterrupted gear ratio change, starting from a currently engaged gear ratio ("1" to "R"), in a direction toward a target gear ratio ("1" to "R"), being operationally connected via the plurality of shift elements (A to G) which are involved in the gear ratio change such that a rotational speed (n5, n6) of at least one of the first and the second another shafts (5, 6), which are both selectively connectable with the electric machine (7), and when torque is present, an equivalent torque which is present at the additional shaft (9) corresponds to a product based on the gear ratio between the at least one of the first and the second another shafts (5, 6) and the additional shaft (9) and a rotational speed (n9) of the additional shaft (9), or
   when torque is present at the additional shaft (9), equivalent to the torque present at the drive engine (3) and present at the electric machine (7), is a product of the gear ratio between the one of the first and the second another shafts (5, 6) and the additional shaft (9) and the rotational speed (n9) of the additional shaft (9), or
   during presence of the torque of the drive engine (3) and torque at the electric machine (7) which is equivalent to the torque of the additional shaft (9), is a sum of a product of a rotational speed (n4) of the input shaft (4) and a first variable (V1) which equals a negative quotient of an initiated torque through the electric machine (7) and a torque initiated through the drive engine (3) and corresponds with a product resulting from the rotational speed (n9) of the additional shaft (9) and a second variable (V2), which equals a product resulting from the gear ratio between the input shaft (4) and the additional shaft (9) and the first variable (V1).

2. The transmission device according to claim 1, wherein each one of the plurality of shift elements (A to G) is a form-locking shift element.

3. The transmission device according to claim 1, wherein the transmission device has at least first, second, third and fourth planetary gear sets (P1 to P4), each of at least the first, the second, the third and the fourth planetary gear sets (P1 to P4) has respective first, second and third shafts, and the first, the second and the third shafts of at least the first, the second, the third and the fourth planetary gear sets are partially connected with one another and, by the plurality of shift elements (A to G), can be at least one of partially rotationally fixed or partially fixed to one another in a rotational fixed manner.

4. The transmission device according to claim 3, wherein the first another shaft (5), which is connectable with the electric machine (7), is connected in a rotationally fixed manner with the first shaft (22) of the fourth planetary gear set (P4) and the second another shaft (6), which is connectable with the electric machine (7), is connected in a rotationally fixed manner with the first shaft (18) of the second planetary gear set (P2).

5. The transmission device according to claim 3, wherein the second another shaft (6), which is connectable with the electric machine (7) and connected, in a rotationally fixed manner, with the first shaft (18) of the second planetary gear set (P2), is simultaneously connectable, in a rotationally fixed manner, with the second shaft (12) of the first planetary gear set (P1).

6. The transmission device according to claim 1, wherein the electric machine (7) is connectable, via one of the plurality of shift elements (G), with either the first another shaft (5) or the second another shaft (6).

7. The transmission device according to claims 3, wherein the input shaft (4) is connectable with the drive engine (3) and is connected with the third shaft (13) of the second planetary gear sets (P2), and the first shaft (18) of the second planetary gear set is operationally connected with the second another shaft (6) that is connectable with the electric machine (7).

8. The transmission device according to claim 3, wherein the input shaft (4), which is connectable with the drive engine (3), is connectable in a rotationally fixed manner, via a first form-locking shift element of the plurality of shift elements (D), with the second shaft (12) of the first planetary gear sets (P1) and, via a second form-locking shift element of the plurality of shift elements (E), with the second shaft (14) of the third planetary gear sets (P3).

9. The transmission device according to claim 3, wherein the second shaft (12) of the first planetary gear set (P1) is connectable, via at least one of the plurality of shift elements (D), with the drive engine (3), and the second shaft (12) of the first planetary gear set (P1) is also connectable, in a rotationally fixed manner, via an additional shift element (C), with the second another shaft (6) that is operationally connectable with the electric machine (7).

10. The transmission device according to claim 3, wherein the second shaft (12) of the first planetary gear set (P1) is connectable at least, via one of the plurality of shift elements (D), with the input shaft (4) that is connectable with the drive engine (3), and the second shaft (12) of the first planetary gear set (P1) is rotationally fixedly connected to a housing, via an additional shift element (B) of the plurality of shift elements.

11. The transmission device according to claim 8, wherein the third shaft (10) of the first planetary gear set (P1), is rotationally fixedly connected to a housing, via a further shift element (A) of the plurality of shift elements, and the second shaft (12) of the first planetary gear set is connectable, via another element (C) of the plurality of shift elements, with the input shaft (4) of the drive engine (3).

12. The transmission device according to claim 8, wherein the first shaft (15) of the first planetary gear set (P1) is torque proof connected with the second shaft (16) of the second planetary gear set (P2), and the second shaft (12) of the first planetary gear set that is connectable with the input shaft (4) of the drive engine (3) is operationally connectable, via a shift element (C) of the plurality of shift elements, to the first shaft (18) of the second planetary gear set which is also connected to the second another shaft (6) that is connectable with the electric machine (7).

13. The transmission device according to claim 12, wherein the second shaft (16) of the second planetary gear set (P2) is connected, in a rotationally fixed manner, with the first shaft (17) of the third planetary gear set (P3), the second shaft (14) of the third planetary gearset is operationally connected, via the second form-locking shift element (E) of the plurality of shift elements, with the input shaft (4) which is connected to the drive engine (3), the first shaft (18) of the second planetary gear set is connected to the second another shaft (6) that is connectable with the electric machine (7), and the first shaft (20) of the the third planetary gear set (P3) is connected with the output (8).

14. The transmission device according to claim 3, wherein the first shaft (22) of the fourth planetary gear set (P4) is operationally connectable with the electric machine (7), and the second shaft (21) of the fourth planetary gear set (P4) is connected, in rotationally fixed manner, with the additional shaft (9) that is connectable with the output (8).

15. The transmission device according to claim 14, wherein the first shaft (22) of the fourth planetary gear set (P4), which is connectable with the electric machine (7), is rotationally fixed by via a shift element (F) of the plurality of shift elements, and the second shaft (21) of the fourth planetary gear set (P4) is connected, in a rotationally fixed manner, with the additional shaft (9) that is connected with the output (8).

16. The transmission device according to claim 1, wherein the electric machine (7) is connectable, via one of the plurality of shift elements (G), with either the first another shaft (5), the second another shaft (6) or with neither of the first and the second another shafts (5, 6).

17. A transmission device (1) having a plurality of shift elements (A to G) which, in an engaged or a disengaged operating condition, are operatable for achieving nine different gear ratios for the transmission device (1),
a drive engine (3) being coupleable at least with an input shaft (4) and an electric machine (7) being selectively coupleable, via one of the plurality of shift elements (G), with either a first another shaft (5), a second another shaft (6) or with neither of the first and the second another shafts (5, 6) while an output (8) being operationally connectable with an additional shaft (9),
the input shaft (4) and at least one of the first and the second another shafts (5, 6) and the additional shaft (9), during at least an approximate traction force uninterrupted gear ratio change starting from a currently engaged gear ratio ("1" to "R"), in a direction toward a target gear ratio ("1" to "R"), being operationally connected via the plurality of shift elements (A to G) which are involved in the gear ratio change such that a rotational speed (n5, n6) of at least one of the first and the second another shafts (5, 6), which are both selectively connectable with the electric machine (7), and when torque is present, an equivalent torque which is present at the additional shaft (9), corresponds to a product based on the gear ratio between the at least one of the first and the second another shafts (5, 6) and the additional shaft (9) and a rotational speed (n9) of the additional shaft (9), or
when torque is present at the additional shaft (9), equivalent to the torque present at the drive engine (3) and present at the electric machine (7), is a product of the gear ratio between the one of the first and the second another shafts (5, 6) and the additional shaft (9) and the rotational speed (n9) of the additional shaft (9), or
during the presence of the torque of the drive engine (3) and torque at the electric machine (7) which is equivalent to the torque of the additional shaft (9), is a sum of a product of a rotational speed (n4) of the input shaft (4) and a first variable (V1) which equals a negative quotient of an initiated torque through the electric machine (7) and a torque initiated through the drive engine (3) and corresponds with a product resulting from the rotational speed (n9) of the additional shaft (9) and a second variable (V2), which equals a product resulting from the gear ratio between the input shaft (4) and the additional shaft (9) and the first variable (V1).

* * * * *